US010808120B2

(12) United States Patent
Wagner et al.

(10) Patent No.: US 10,808,120 B2
(45) Date of Patent: Oct. 20, 2020

(54) POLYESTER BLEND HAVING A HALOGEN-FREE FLAME PROTECTION

(71) Applicant: BASF SE, Ludwigshafen am Rhein (DE)

(72) Inventors: Sebastian Wagner, Mannheim (DE); Roland Helmut Kraemer, Shanghai (CN)

(73) Assignee: BASF SE, Ludwigshafen (DE)

(*) Notice: Subject to any disclaimer, the term of this patent is extended or adjusted under 35 U.S.C. 154(b) by 109 days.

(21) Appl. No.: 15/767,546

(22) PCT Filed: Sep. 22, 2016

(86) PCT No.: PCT/EP2016/072569
§ 371 (c)(1),
(2) Date: Apr. 11, 2018

(87) PCT Pub. No.: WO2017/063841
PCT Pub. Date: Apr. 20, 2017

(65) Prior Publication Data
US 2018/0298189 A1    Oct. 18, 2018

(30) Foreign Application Priority Data
Oct. 14, 2015  (EP) .................................... 15189683

(51) Int. Cl.
*C08L 67/02* (2006.01)
*C08K 5/5313* (2006.01)

(52) U.S. Cl.
CPC ............ *C08L 67/02* (2013.01); *C08K 5/5313* (2013.01); *C08L 2205/03* (2013.01)

(58) Field of Classification Search
CPC ... C08L 67/02; C08L 2205/03; C08K 5/5313; C08K 5/0066; C08K 5/34922; C08K 5/34924; C08K 5/5333; C08J 5/18
USPC ......................................................... 524/127
See application file for complete search history.

(56) References Cited

U.S. PATENT DOCUMENTS

| 6,503,969 B1 | 1/2003 | Klatt et al. |
| 6,547,992 B1 | 4/2003 | Schlosser et al. |
| 2002/0151618 A1* | 10/2002 | Bastioli .................... C08L 67/02 523/124 |
| 2008/0167406 A1 | 7/2008 | Yamada |
| 2011/0071238 A1* | 3/2011 | Bastioli ................ C08G 63/672 524/17 |
| 2011/0178196 A1* | 7/2011 | Steinke .................... C08L 67/02 521/135 |
| 2013/0146330 A1* | 6/2013 | Ni ........................... C08L 67/00 174/120 SR |
| 2013/0310494 A1 | 11/2013 | Xue et al. |

FOREIGN PATENT DOCUMENTS

| DE | 19960671 A1 | 9/2000 |
| EP | 1084181 A1 | 3/2001 |
| EP | 1423260 A1 | 6/2004 |
| EP | 1935944 A2 | 6/2008 |
| EP | 2476730 A1 | 7/2012 |
| WO | WO-2006/018127 A1 | 2/2006 |

OTHER PUBLICATIONS

International Application No. PCT/EP2016/072569, International Search Report (English translation), dated Oct. 27, 2016.
International Application No. PCT/EP2016/072569, Written Opinion (German), dated Oct. 27, 2016.
Levchik, S. V., et al., "Synergistic Action Between Aryl Phosphates and Phenolic Resin in PBT." *Polymer Degradation and Stability* 77, No. 2 (2002), pp. 267-272.

* cited by examiner

*Primary Examiner* — Doris L Lee
(74) *Attorney, Agent, or Firm* — Marshall, Gerstein & Borun LLP

(57) ABSTRACT

The invention relates to thermoplastic molding compositions comprising
A) from 10 to 99% by weight of a thermoplastic polyester differing from C)
B) from 0.1 to 30% by weight of a poly(ε-caprolactone)
C) from 0.1 to 30% by weight of a biodegradable polyester differing from B)
D) from 0.1 to 30% by weight of a phosphinic salt
E) from 0 to 20% by weight of a nitrogen-containing flame retardant
F) from 0 to 15% by weight of an aromatic phosphate ester having at least one alkyl-substituted phenyl ring
G) from 0 to 50% by weight of further additional substances, where the sum of the percentages by weight of components A) to G) is 100%.

16 Claims, No Drawings

POLYESTER BLEND HAVING A HALOGEN-FREE FLAME PROTECTION

CROSS-REFERENCE TO RELATED APPLICATIONS

This is the U.S. national phase of International Application No. PCT/EP2016/072569, filed Sep. 22, 2016, which claims the benefit of European Patent Application No. 15189683.4, filed Oct. 14, 2015.

The invention relates to thermoplastic molding compositions comprising
A) from 10 to 99% by weight of a thermoplastic polyester differing from C)
B) from 0.1 to 30% by weight of a poly(ε-caprolactone)
C) from 0.1 to 30% by weight of a biodegradable polyester differing from B)
D) from 0.1 to 30% by weight of a phosphinic salt
E) from 0 to 20% by weight of a nitrogen-containing flame retardant
F) from 0 to 15% by weight of an aromatic phosphate ester having at least one alkyl-substituted phenyl ring
G) from 0 to 50% by weight of further additional substances,
where the sum of the percentages by weight of components A) to G) is 100%.

The invention further relates to the use of the thermoplastic molding compositions for the production of flame-retardant moldings of any type, and to the resultant moldings.

Thermoplastic polyesters are materials with a long history of use. Factors of increasing importance, alongside the mechanical, thermal, electrical and chemical properties of these materials, are properties such as flame retardancy and high glow-wire resistance. Examples here are applications in the household products sector (e.g. plugs) and in the electronics sector (e.g. protective covers for circuit breakers).

The market is moreover showing increasing interest in thermoplastic polyesters with a halogen-free flame-retardancy system. The significant requirements placed upon the flame retardant here are pale intrinsic color, adequate thermal stability during polymer processing, and also effective flame retardancy in reinforced and unreinforced polymer.

The effectiveness of halogen-free flame retardant additive mixtures consisting of phosphinates and of nitrogen-containing synergists and, respectively, of reaction products of melamine with phosphoric acid (melamine polyphosphate) is in essence described via UL 94 V fire tests; see EP-A 142 3260, EP-A 108 4181.

DE-A-199 60 671 describes not only conventional flame retardants, for example phosphinic salts and melamine compounds, but also combinations with metal oxides, with metal hydroxides or with other salts.

The particular problem of those formulations is that their mechanical properties include brittleness, which often leads to premature fracture in use (tensile strain at break). Various approaches based on polymer mixtures have been described: use of commercially available impact modifiers (products marketed as Lotader®, Paraloid®, Metablen®) leads to a significant improvement the mechanical properties but it then becomes impossible to realize flame-retardant products with low wall thicknesses. The reason is that said additives are highly combustible, being to a large extent based on ethylene or butadiene. Tough flame-retardant products are therefore often achieved via mixtures of PBT with various elastomers (US2008/0167406 and EP-A-2476730), but the same disadvantages arise here.

WO2006/018127 describes polyester mixtures which comprise not only flow improvers but also rubbers as impact modifiers. Mechanical properties can be improved in these mixtures, but addition of the rubbers in turn impairs rheological properties.

The commercially distributed flame-retardant ABS and PC additives resorcinol bisdiphenyl phosphate (RDP, CAS: 57583-54-7) and bisphenol-A diphenyl phosphate (BDP, CAS: 5945-33-5) exhibit disadvantages in terms of migration (see Polymer Degradation and Stability, 2002, 77(2), pp. 267-272).

It was therefore an object of the present invention to provide polyester molding compositions which have a halogen-free flame-retardancy system and which have good mechanical properties (tensile strain at break) and flame-retardancy properties. Processing should moreover be improved, as also should the migration behavior of the additives during processing and in the desired applications (in particular for thin-walled parts).

The molding compositions defined in the introduction have accordingly been found. The dependent claims provide preferred embodiments.

The molding compositions of the invention comprise, as component (A), from 10 to 99% by weight, preferably from 20 to 92% by weight and in particular from 35 to 80% by weight, of at least one thermoplastic polyester differing from B) or C).

Use is generally made of polyesters A) based on aromatic dicarboxylic acid and on an aliphatic or aromatic dihydroxy compound.

Polyalkylene terephthalates, in particular those having from 2 to 10 carbon atoms in the alcohol moiety, are a first group of preferred polyesters.

These polyalkylene terephthalates are known per se and are described in the literature. They comprise, in the main chain, an aromatic ring that derives from the aromatic dicarboxylic acid. The aromatic ring can also have substitution, e.g. by halogen such as chlorine and bromine, or by $C_1$-$C_4$-alkyl groups such as methyl, ethyl, isopropyl, n-propyl, and n-butyl, isobutyl and tert-butyl groups.

These polyalkylene terephthalates can be produced by reaction of aromatic dicarboxylic acids, or their esters or other ester-forming derivatives, with aliphatic dihydroxy compounds in a manner known per se.

Preferred dicarboxylic acids that may be mentioned are 2,6-naphthalenedicarboxylic acid, terephthalic acid and isophthalic acid and mixtures thereof. Up to 30 mol %, preferably not more than 10 mol %, of the aromatic dicarboxylic acids can be replaced by aliphatic or cycloaliphatic dicarboxylic acids such as adipic acid, azelaic acid, sebacic acid, dodecanedioic acids and cyclohexanedicarboxylic acids.

Among the aliphatic dihydroxy compounds, preference is given to diols having from 2 to 6 carbon atoms, in particular 1,2-ethanediol, 1,3-propanediol, 1,4-butanediol, 1,6-hexanediol, 1,4-hexanediol, 1,4-cyclohexanediol, 1,4-cyclohexanedimethanol and neopentyl glycol and mixtures of these.

Particularly preferred polyesters (A) that may be mentioned are polyalkylene terephthalates that derive from alkanediols having from 2 to 6 carbon atoms. Among these, preference is in particular given to polyethylene terephthalate, polypropylene terephthalate and polybutylene terephthalate and mixtures of these. Preference is further given to PET and/or PBT which comprise up to 1% by weight, preferably up to 0.75% by weight, of 1,6-hexanediol and/or 2-methyl-1,5-pentanediol as further monomer units.

The intrinsic viscosity of the polyesters (A) is generally in the range from 50 to 220, preferably from 80 to 160 (measured in 0.5% by weight solution in a phenol/o-dichlorobenzene mixture (ration by weight 1:1 at 25° C.) in accordance with ISO 1628).

Preference is in particular given to polyesters having carboxy end group content of up to 100 meq/kg of polyester, preferably up to 50 meq/kg and in particular up to 40 meq/kg. These polyesters can by way of example be produced by the process of DE-A 44 01 055. Carboxy end group content is usually determined by titration methods (e.g. potentiometry).

It is moreover advantageous to use PET recyclates (also known as scrap PET), optionally in a mixture with polyalkylene terephthalates such as PBT.

The term recyclates generally means:
1) those known as post-industrial recylates: these are the production wastes during polycondensation or during processing, e.g. sprues from injection molding, start-up material from injection molding or extrusion, or edge trims from extruded sheets or films.
2) post-consumer recyclates: these are plastics items which are collected and treated after utilization by the end consumer. Blow-molded PET bottles for mineral water, soft drinks and juices are easily the predominant items in terms of quantity.

Both types of recyclate may be used either as regrind or in the form of pellets. In the latter case, the crude recycled materials are isolated and purified and then melted and pelletized using an extruder. This usually facilitates handling and free-flowing properties, and metering for further steps in processing.

The recycled materials used may either be pelletized or in the form of regrind. The edge length should not be more than 10 mm and should preferably be less than 8 mm.

Because polyesters undergo hydrolytic cleavage during processing (due to traces of moisture) it is advisable to predry the recycled material. Residual moisture content after drying is preferably <0.2%, in particular <0.05%.

Another group to be mentioned is that of fully aromatic polyesters deriving from aromatic dicarboxylic acids and aromatic dihydroxy compounds.

Suitable aromatic dicarboxylic acids are the compounds previously described for the polyalkylene terephthalates. Preference is given to use of mixtures of from 5 to 100 mol % of isophthalic acid and from 0 to 95 mol % of terephthalic acid, in particular to mixtures of about 80% to 50% of terephthalic acid with from 20% to 50% of isophthalic acid.

The aromatic dihydroxy compounds preferably have the general formula

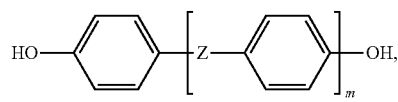

in which Z is an alkylene or cycloalkylene group having up to 8 carbon atoms, an arylene group having up to 12 carbon atoms, a carbonyl group, a sulfonyl group, an oxygen atom or sulfur atom, or a chemical bond, and in which m has the value from 0 to 2. The phenylene groups in the compounds may also have substitution by $C_1$-$C_6$-alkyl groups or alkoxy groups, and fluorine, chlorine, or bromine.

Examples of parent compounds for these compounds are dihydroxybiphenyl,
di(hydroxyphenyl)alkane,
di(hydroxyphenyl)cycloalkane,
di(hydroxyphenyl) sulfide,
di(hydroxyphenyl) ether,
di(hydroxyphenyl) ketone,
di(hydroxyphenyl) sulfoxide,
α,α'-di(hydroxyphenyl)dialkylbenzene,
di(hydroxyphenyl)sulfone,
di(hydroxybenzoyl)benzene,
resorcinol, and hydroquinone, and also the ring-alkylated and ring-halogenated derivatives of these.

Among these, preference is given to
4,4'-dihydroxybiphenyl,
2,4-di(4'-hydroxyphenyl)-2-methylbutane,
α,α'-di(4-hydroxyphenyl)-p-diisopropylbenzene,
2,2-di(3'-methyl-4'-hydroxyphenyl)propane, and
2,2-di(3'-chloro-4'-hydroxyphenyl)propane,
and in particular to
2,2-di(4'-hydroxyphenyl)propane,
2,2-di(3',5-dichlorodihydroxyphenyl)propane,
1,1-di(4'-hydroxyphenyl)cyclohexane,
3,4'-dihydroxybenzophenone,
4,4'-dihydroxydiphenyl sulfone and
2,2-di(3',5'-dimethyl-4'-hydroxyphenyl)propane
or a mixture of these.

It is, of course, also possible to use mixtures of polyalkylene terephthalates and fully aromatic polyesters. These generally comprise from 20 to 98% by weight of the polyalkylene terephthalate and from 2 to 80% by weight of the fully aromatic polyester.

It is, of course, also possible to use polyester block copolymers, such as copolyetheresters. Products of this type are known per se and are described in the literature, e.g. in U.S. Pat. No. 3,651,014. Corresponding products are also available commercially, e.g. Hytrel® (DuPont).

Halogen free polycarbonates are also polyesters in the invention. Examples of suitable halogen-free polycarbonates are those based on biphenols of the general formula

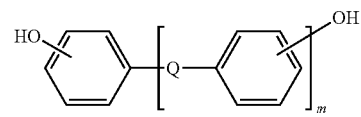

in which Q is a single bond, a $C_1$-$C_8$-alkylene group, a $C_2$-$C_3$-alkylidene group, a $C_3$-$C_6$-cycloalkylidene group, a $C_6$-$C_{12}$-arylene group, or else —O—, —S— or —SO$_2$—, and m is an integer from 0 to 2.

The phenylene radicals of the biphenols may also have substituents, such as $C_1$-$C_6$-alkyl or $C_1$-$C_6$-alkoxy.

Examples of preferred biphenols of the formula are hydroquinone, resorcinol, 4,4'-dihydroxybiphenyl, 2,2-bis(4-hydroxyphenyl)propane, 2,4-bis(4-hydroxyphenyl)-2-methylbutane and 1,1-bis(4-hydroxyphenyl)cyclohexane. Particular preference is given to 2,2-bis(4-hydroxyphenyl) propane and 1,1-bis(4-hydroxyphenyl)cyclohexane, and also to 1,1-bis(4-hydroxyphenyl)-3,3,5-trimethylcyclohexane.

Either homopolycarbonates or copolycarbonates are suitable as component A, and preference is given to the copolycarbonates of bisphenol A, as well as to bisphenol A homopolymer.

Suitable polycarbonates may be branched in a known manner, specifically and preferably by incorporating from 0.05 to 2.0 mol %, based on the total of the biphenols used, of at least trifunctional compounds, for example those having three or more phenolic OH groups.

Polycarbonates which have proven particularly suitable have relative viscosities $\eta_{rel}$ n of from 1.10 to 1.50, in particular from 1.25 to 1.40. This corresponds to average molar masses $M_w$ (weight average) of from 10 000 to 200 000 g/mol, preferably from 20 000 to 80 000 g/mol.

The biphenols of the general formula are known per se or can be produced by known processes.

The polycarbonates may, for example, be produced by reacting the biphenols with phosgene in the interfacial process, or with phosgene in the homogeneous-phase process (known as the pyridine process), and in each case the desired molecular weight is achieved in a known manner by using an appropriate amount of known chain terminators. (In relation to polydiorganosiloxane-containing polycarbonates see, for example, DE-A 33 34 782.)

Examples of suitable chain terminators are phenol, p-tert-butylphenol, or else long-chain alkylphenols, such as 4-(1,3-tetramethylbutyl)phenol, as in DE-A 28 42 005, or monoalkylphenols, or dialkylphenols with a total of from 8 to 20 carbon atoms in the alkyl substituents, as in DE-A 35 06 472, such as p-nonylphenyl, 3,5-di-tert-butylphenol, p-tert-octylphenol, p-dodecylphenol, 2-(3,5-dimethylheptyl)phenol and 4-(3,5-dimethylheptyl)phenol.

For the purposes of the present invention, the expression halogen-free polycarbonates means polycarbonates made from halogen-free biphenols, from halogen-free chain terminators and optionally from halogen-free branching agents, where the content of subordinate amounts at the ppm level of hydrolyzable chlorine, resulting, for example, from the production of the polycarbonates with phosgene in the interfacial process, is not regarded as meriting the term halogen-containing for the purposes of the invention. Polycarbonates of this type with contents of hydrolyzable chlorine at the ppm level are halogen-free polycarbonates for the purposes of the present invention.

Other suitable components A) that may be mentioned are amorphous polyester carbonates, where phosgene has been replaced during a production process by aromatic dicarboxylic acid units such as isophthalic acid and/or terephthalic acid units. Reference may be made at this point to EP-A 711 810 for further details.

Other suitable copolycarbonates having cycloalkyl moieties as monomer units are described in EP-A 365 916.

Bisphenol A can moreover be replaced by bisphenol TMC. Polycarbonates of this type are obtainable commercially from Bayer with trademark APEC HT®.

The molding compositions of the invention comprise, as component B), from 0.1 to 30% by weight, preferably from 0.5 to 15% by weight, in particular from 1 to 10% by weight and very particularly preferably from 1 to 5% by weight, of a poly ε-caprolactone.

Polyesters of this type exhibit the following structure:

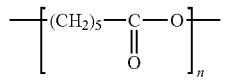

They are usually produced by ring-opening polymerization of ε-caprolactone.

These polymers are semicrystalline, and are classified as biodegradable polyesters.

According to Römpp Online Lexikon [Römpp's on-line encyclopedia], these are polymers which are degraded in the presence of microorganisms in a biologically active environment (compost, etc.). (In contrast to oxo-degradable polyesters and UV-initiated polyester degradation.)

The average molar mass $M_w$ of preferred components B) is from 5000 to 200 000 g/mol, in particular from 50 000 to 140 000 g/mol (determined by means of GPC with hexafluoroisopropanol and 0.05% of potassium trifluoroacetate as solvent, using PMMA as standard).

Melting range (DSC, 20 K/min in accordance with DIN 11357) is generally from 80 to 150, preferably from 100 to 130° C.

Products of this type are obtainable commercially by way of example from Perstorp as Capa®.

The molding compositions of the invention comprise, as component C), from 0.1 to 30% by weight, preferably from 0.5 to 15% by weight, in particular from 1 to 10% by weight and very particularly preferably from 1 to 5% by weight, of a biodegradable polyester differing from B) and A).

The above is preferably intended to mean aliphatic-aromatic polyesters.

The expression aliphatic-aromatic polyesters C) means linear, chain-extended, and preferably branched and chain-extended, polyesters, as described by way of example in WO 96/15173 to 15176 or in WO 98/12242, expressly incorporated herein by way of reference. Mixtures of various semiaromatic polyesters can equally be used. More recent developments that are of interest are based on renewable raw materials (see WO2010/034689). In particular, the expression polyesters C) means products such as Ecoflex® (BASF SE).

Among the preferred polyesters C) are polyesters comprising, as significant components:

C1) from 30 to 70 mol %, preferably from 40 to 60 mol %, and with particular preference from 50 to 60 mol %, based on components C1) to C2), of an aliphatic dicarboxylic acid or mixture thereof, preferably as in the following list: adipic acid, azelaic acid, sebacic acid and brassylic acid, C2) from 30 to 70 mol %, preferably from 40 to 60 mol % and with particular preference from 40 to 50 mol %, based on components C1) and C2) of an aromatic dicarboxylic acid or mixture thereof, preferably as follows: terephthalic acid, C3) from 98.5 to 100 mol %, based on components C1) to C2), of 1,4-butanediol and 1,3-propanediol; and C4) from 0.05 to 1.5% by weight, preferably from 0.1 to 0.2% by weight, based on components C1) to C3), of a chain extender, in particular a di- or polyfunctional isocyanate, preferably hexamethylene diisocyanate, and optionally a branching agent, preferably: trimethylolpropane, pentaerythritol and in particular glycerol.

Aliphatic diacids and the corresponding derivatives 01) that can be used are those having from 6 to 20 carbon atoms, preferably from 6 to 10 carbon atoms. They can be either linear or branched. In principle, however, it is also possible to use dicarboxylic acids having a larger number of carbon atoms, for example having up to 30 carbon atoms.

The following may be mentioned by way of example: 2-methylglutaric acid, 3-methylglutaric acid, α-ketoglutaric acid, adipic acid, pimelic acid, azelaic acid, sebacic acid, brassylic acid, suberic acid, and itaconic acid. It is possible here to use the dicarboxylic acids or ester-forming derivatives of these, individually or as mixture of two or more thereof.

It is preferable to use adipic acid, azelaic acid, sebacic acid, brassylic acid or respective ester-forming derivatives thereof or a mixture thereof. It is particularly preferably to use adipic acid or sebacic acid or respective ester-forming derivatives thereof or mixtures thereof.

Preference is in particular given to the following aliphatic-aromatic polyesters: polybutylene adipate terephthalate (PBAT), polybutylene sebacate terephthalate (PBSeT).

The aromatic dicarboxylic acids or ester-forming derivatives thereof C2 can be used individually or in the form of mixture of two or more thereof. Particular preference is given to use of terephthalic acid or ester-forming derivatives thereof, for example dimethyl terephthalate.

The diols C3—1,4-butanediol and 1,3-propanediol—are obtainable in the form of renewable raw material. It is also possible to use mixtures of the diols mentioned.

Use is generally made of from 0.05 to 1.5% by weight, preferably from 0.1 to 1.0% by weight and with particular preference from 0.1 to 0.3% by weight, based on the total weight of the polyester, of a branching agent, and/or of from 0.05 to 1% by weight, preferably from 0.1 to 1.0% by weight, based on the total weight of the polyester, of a chain extender C4), selected from the group consisting of: a polyfunctional isocyanate, isocyanurate, oxazoline, carboxylic anhydride such as maleic anhydride, epoxide (in particular an epoxide-containing poly(meth)acrylate), an at least trihydric alcohol or an at least tribasic carboxylic acid. Compounds that can be used as chain extenders C4) are polyfunctional and in particular difunctional isocyanates, isocyanurates, oxazolines or epoxides.

Other compounds that can be regarded as branching agents are chain extenders, and also alcohols or carboxylic acid derivatives, having at least three functional groups. Particularly preferred compounds have from three to six functional groups. The following may be mentioned by way of example: tartaric acid, citric acid, malic acid, trimesic acid, trimellitic acid, trimellitic anhydride, pyromellitic acid and pyromellitic dianhydride; trimethylolpropane, trimethylolethane; pentaerythritol, polyethertriols and glycerol. Preference is given to polyols such as trimethylolpropane, pentaerythritol and in particular glycerol. By means of components C4) it is possible to construct biodegradable polyesters that have pseudoplastic properties. The rheology of the melts improves; easier processing of the biodegradable polyesters becomes possible.

It is generally advisable to add the branching (at least trifunctional) compounds at a relatively early juncture in the polymerization procedure.

Examples of suitable bifunctional chain extenders are tolylene 2,4-diisocyanate, tolylene 2,6-diisocyanate, diphenylmethane 2,2'-diisocyanate, diphenylmethane 2,4'-diisocyanate, diphenylmethane 4,4'-diisocyanate, naphthylene 1,5-diisocyanate, xylylene diisocyanate, hexamethylene 1,6-diisocyanate, isophorone diisocyanate and methylene bis(4-isocyanatocyclohexane). Particular preference is given to isophorone diisocyanate and in particular to hexamethylene 1,6-diisocyanate.

The number-average molar mass (Mn) of the polyesters C) is generally in the range from 5000 to 100 000 g/mol, in particular in the range from 10 000 to 75 000 g/mol, preferably in the range from 15 000 to 38 000 g/mol, while their weight-average molar mass (Mw) is from 30 000 to 300 000 g/mol, preferably from 60 000 to 200 000 g/mol, and their Mw/Mn ratio is form 1 to 6, preferably from 2 to 4. Intrinsic viscosity is preferably from 50 to 450, preferably from 80 to 250 g/ml (measured in o-dichlorobenzene/phenol (ratio by weight 50/50). Melting point is in the range from 85 to 150, preferably in the range from 95 to 140° C.

MVR (melt volume rate) in accordance with EN ISO 1133-1 DE (190° C., 2.16 kg weight) is generally from 0.5 to 8 cm³/10 min, preferably from 0.8 to 6 cm³/10 min. Acid numbers in accordance with DIN EN 12634 are generally from 0.01 to 1.2 mg KOH/g, preferably from 0.01 to 1.0 mg KOH/g and with particular preference from 0.01 to 0.7 mg KOH/g.

The molding compositions of the invention comprise, as component D), from 0.1 to 30% by weight, preferably from 5 to 25% by weight and in particular from 10 to 25% by weight, based on A) to C), of a phosphinic salt.

Preference is given to phosphinic salts of the formula (I) or/and diphosphinic salts of the formula (II) or polymers of these:

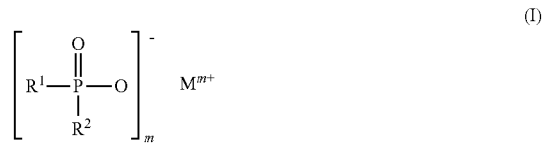

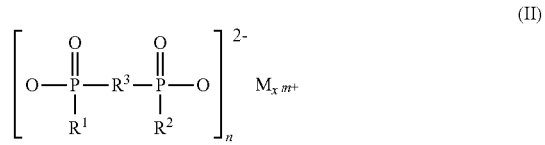

in which

R¹ and R², being identical or different, are hydrogen or, in linear or branched form, $C_1$-$C_6$-alkyl, and/or aryl

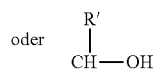

R' is hydrogen, phenyl, tolyl;
R³ is, in linear or branched form, $C_1$-$C_{10}$-alkylene, or $C_6$-$C_{10}$-arylene, -alkylarylene or -arylalkylene;
M is Mg, Ca, Al, Sb, Sn, Ge, Ti, Zn, Fe, Zr, Ce, Bi, Sr, Mn, Li, Na, K and/or a protonated nitrogen base;
m is from 1 to 4; n is from 1 to 4; x is from 1 to 4.

It is preferable that R¹ and R² of component D, being identical or different, are hydrogen, methyl, ethyl, n-propyl, isopropyl, n-butyl, tert-butyl, n-pentyl and/or phenyl.

It is preferable that R³ of component D is methylene, ethylene, n-propylene, isopropylene, n-butylene, tert-butylene, n-pentylene, n-octylene or n-dodecylene, phenylene or naphthylene; methylphenylene, ethylphenylene, tert-butylphenylene, methylnaphthylene, ethylnaphthylene or tert-butylnaphthylene; phenylmethylene, phenylethylene, phenylpropylene or phenylbutylene.

It is particularly preferable that R¹ and R² are hydrogen, methyl, ethyl and that M=Mg, Ca, Zn, Al, particular preference being given here to Al hypophosphite and to Al diethylphosphinate.

The phosphinates are preferably produced by precipitation of the corresponding metal salts from aqueous solutions. The phosphinates can also, however, be precipitated in the presence of a suitable inorganic metal oxide or metal sulfide as support material (white pigments, for example $TiO_2$, $SnO_2$, ZnO, ZnS, $SiO_2$). This gives surface-modified pigments which can be used as laser-markable flame retardants for thermoplastic polyesters.

The molding compositions of the invention can comprise, as component E), from 0 to 20% by weight, preferably from 1 to 20% by weight and in particular from 1 to 15% by weight, of a nitrogen-containing flame retardant, preferably a melamine compound.

The melamine cyanurate that is preferably suitable in the invention (component E) is a reaction product of preferably equimolar quantities of melamine (formula I) and cyanuric acid or isocyanuric acid (formulae Ia and Ib)

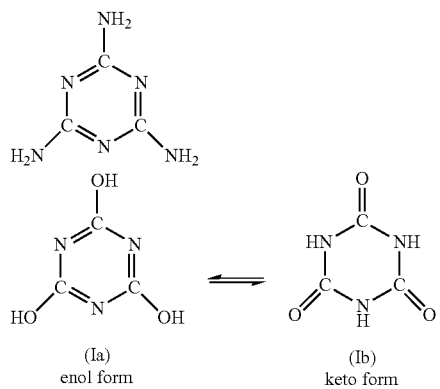

(Ia) enol form    (Ib) keto form

It is obtained by way of example via reaction of aqueous solutions of the starting compounds at from 90 to 100° C. The commercially available product is a white powder of average $d_{50}$ grain size from 1.5 to 7 μm having a $d_{99}$ value smaller than 50 μm.

Other suitable compounds (often also termed salts or adducts) are melamine sulfate, melamine, melamine borate, melamine oxalate, melamine phosphate prim., melamine phosphate sec. and melamine pyrophosphate sec., melamine neopentyl glycol borate, and also polymeric melamine phosphate (CAS No. 56386-64-2 or 218768-84-4).

Preference is given to melamine polyphosphate salts derived from a 1,3,5-triazine compound of which the number n representing the average degree of condensation is from 20 to 200, and the 1,3,5-triazine content per mole of phosphorus atom is from 1.1 to 2.0 mol of a 1,3,5-triazine compound selected from the group consisting of melamine, melam, melem, melon, ammeline, ammelide, 2-ureidomelamine, acetoguanamine, benzoguanamine, and diaminophenyltriazine. It is preferable that the n value of these salts is generally from 40 to 150, and that the molar ratio of a 1,3,5-triazine compound to phosphorus atom is from 1.2 to 1.8. The pH of a 10% by weight aqueous slurry of salts produced as in EP-B1095030 is moreover generally more than 4.5 and preferably at least 5.0. The pH is usually determined by placing 25 g of the salt and 225 g of pure water at 25° C. in a 300 ml beaker, stirring the resultant aqueous slurry for 30 minutes, and then measuring the pH. The abovementioned n value, the number-average degree of condensation, can be determined by means of 31P solid-state NMR. J. R. van Wazer, C. F. Callis, J. Shoolery and R. Jones, J. Am. Chem. Soc., 78, 5715, 1956 disclose that the number of adjacent phosphate groups is given by a unique chemical shift which permits clear distinction between orthophosphates, pyrophosphates, and polyphosphates. EP1095030B1 moreover describes a process for producing the desired polyphosphate salt of a 1,3,5-triazine compound which has an n value of from 20 to 200, where the 1,3,5-triazine content of said 1,3,5-triazine compound is from 1.1 to 2.0 mol of a 1,3,5-triazine compound. Said process comprises conversion of a 1,3,5-triazine compound into its orthophosphate salt by orthophosphoric acid, followed by dehydration and heat treatment in order to convert the orthophosphate salt into a polyphosphate of the 1,3,5-triazine compound. Said heat treatment is preferably carried out at a temperature of at least 300° C., and preferably at at 310° C. In addition to orthophosphates of 1,3,5-triazine compounds, it is equally possible to use other 1,3,5-triazine phosphates, inclusive of, for example, a mixture of orthophosphates and of pyrophosphates.

| Suitable guanidine salts are | |
|---|---|
|  | CAS No. |
| G carbonate | 593-85-1 |
| G cyanurate prim. | 70285-19-7 |
| G phosphate prim. | 5423-22-3 |
| G phosphate sec. | 5423-23-4 |
| G sulfate prim. | 646-34-4 |
| G sulfate sec. | 594-14-9 |
| Guanidine pentaerythritol borate | N.A. |
| Guanidine neopentyl glycol borate | N.A. |
| and also urea phosphate green | 4861-19-2 |
| Urea cyanurate | 57517-11-0 |
| Ammeline | 645-92-1 |
| Ammelide | 645-93-2 |
| Melem | 1502-47-2 |
| Melon | 32518-77-7 |

Compounds for the purposes of the present invention are intended to be not only by way of example benzoguanamine itself and its adducts or salts but also the derivatives substituted on nitrogen and their adducts or salts.

Other suitable compounds are ammonium polyphosphate $(NH_4PO_3)_n$ where n is about 200 to 1000, preferably from 600 to 800, and tris(hydroxyethyl) isocyanurate (THEIC) of the formula IV

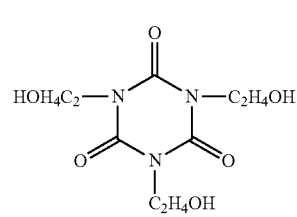

IV or its reaction products with aromatic carboxylic acids $Ar(COOH)_m$, optionally in mixtures with one another, where Ar is a mono-, bi-, or trinuclear aromatic six-membered ring system, and m is 2, 3, or 4.

Examples of suitable carboxylic acids are phthalic acid, isophthalic acid, terephthalic acid, 1,3,5-benzenetricarboxylic acid, 1,2,4-benzenetricarboxylic acid, pyromellitic acid, mellophanic acid, prehnitic acid, 1-naphthoic acid, 2-naphthoic acid, naphthalenedicarboxylic acids, and anthracenecarboxylic acids.

They are produced by reacting the tris(hydroxyethyl) isocyanurate with the acids, or with their alkyl esters or their halides in accordance with the processes in EP-A 584 567.

Reaction products of this type are a mixture of monomeric and oligomeric esters which may also have crosslinking. The degree of oligomerization is usually from 2 to about 100, preferably from 2 to 20. Preference is given to the use of THEIC and/or its reaction products in mixtures with phosphorus-containing nitrogen compounds, in particular $(NH_4PO_3)_n$ or melamine pyrophosphate or polymeric melamine phosphate. The mixing ratio, for example of $(NH_4PO_3)_n$ to THEIC, is preferably 90-50:10-50% by weight, in particular 80-50:50-20% by weight, based on the mixture of components B1) of this type.

Other suitable compounds are benzoguanamine compounds of the formula V

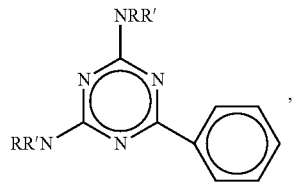

(V)

where R and R' are straight-chain or branched alkyl radicals having from 1 to 10 carbon atoms, preferably hydrogen and in particular their adducts with phosphoric acid, boric acid and/or pyrophosphoric acid.

Preference is also given to allantoin compounds of the formula VI

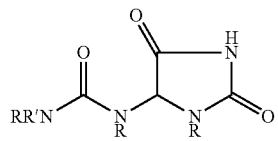

(VI)

where R and R' are as defined in formula V, and also to the salts of these with phosphoric acid, boric acid and/or pyrophosphoric acid, and also to glycolurils of the formula VII and to their salts with the abovementioned acids.

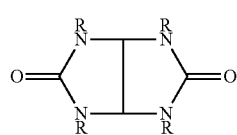

(VII)

where R is as defined in formula V.

Suitable products are obtainable commercially or in accordance with DE-A 196 14 424.

The cyanoguanidine (formula VIII) which can be used according to the invention is obtained, for example, by reacting calcium cyanamide with carbonic acid, whereupon the cyanamide produced dimerizes at a pH of from 9 to 10 to give cyanoguanidine.

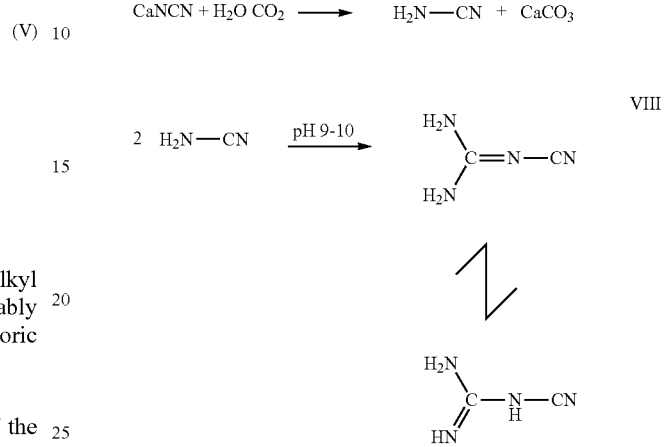

The product obtainable commercially is a white powder with a melting point of from 209° C. to 211° C.

It is preferable that the ratio of component B) to component C) is from 1:1 to 5:1, in particular from 1:1.5 to 1:2.5.

It is very particularly preferable in the invention to use melamine cyanurate having the following particle size distribution:

$d_{98}$<25 μm, preferably <20 μm $d_{50}$<4.5 μm, preferably <3 μm.

The person skilled in the art generally understands a $d_{50}$ value to be the particle size value which is smaller than that of 50% of the particles and larger than that of 50% of the particles.

The particle size distribution is usually determined via laser scattering (by analogy with ISO 13320).

The molding compositions of the invention can comprise, as component F), from 0 to 15% by weight, preferably from 0.1 to 15% by weight, in particular from 0.5 to 10% by weight, of an aromatic phosphate ester having at least one alkyl-substituted phenyl ring.

The melting point of preferred P esters is from 50 to 150° C., preferably from 60 to 110° C., measured by means of DSC in accordance with ISO 11357, 1st heating curve at 20 K/minute.

Preferred components F) are composed of:

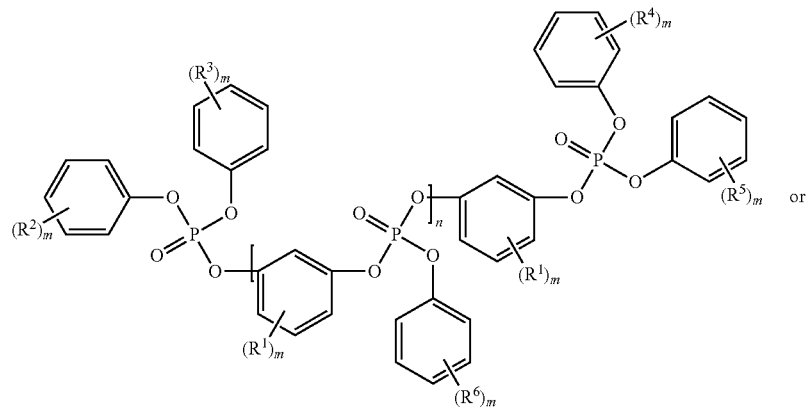

III

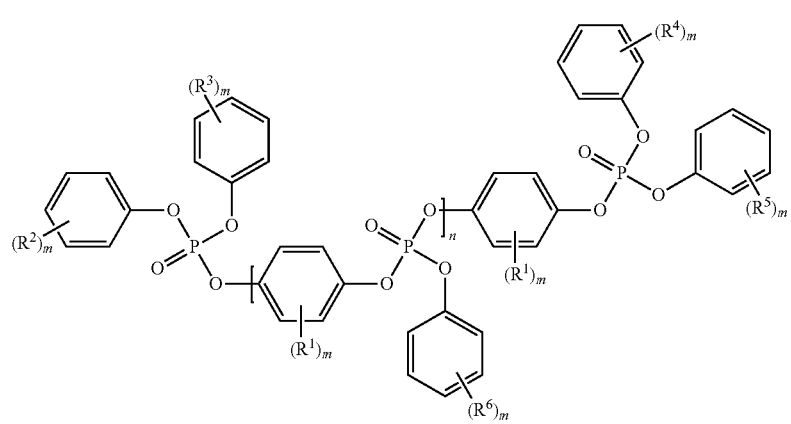

IV

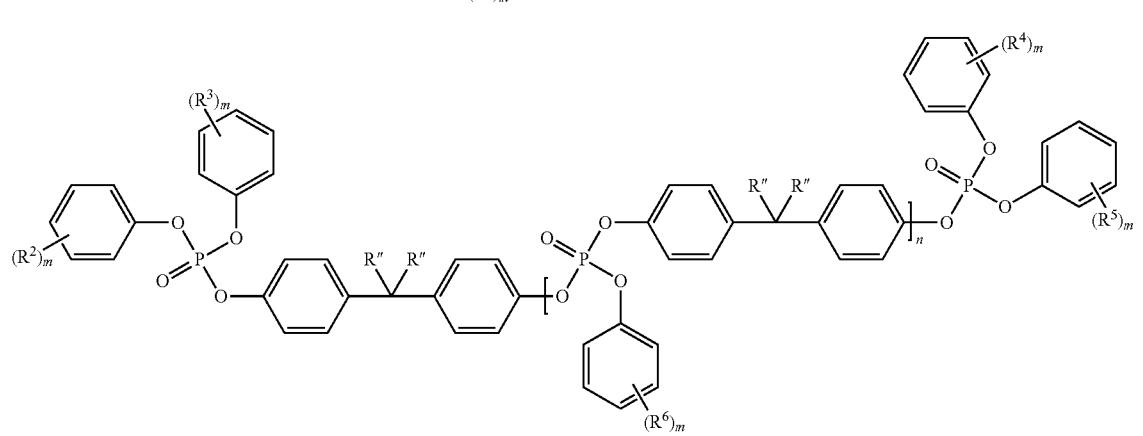

V or a mixture of these,
where, mutually independently,
$R^1$=H, methyl or isopropyl, preferably H,
n=from 0 to 7, preferably 0,
$R^{2-6}$=H, methyl, ethyl or isopropyl, preferably methyl,
m=from 1 to 5, preferably from 1 to 2,
R''=H, methyl, ethyl or cyclopropyl, preferably methyl or hydrogen
with the proviso that at least one moiety $R^2$ to $R^6$ is an alkyl moiety.

It is preferable that the moieties $R^6$ and $R^4$ are identical, and in particular the moieties $R^2$ to $R^6$ are identical.

Preferred component F) is:

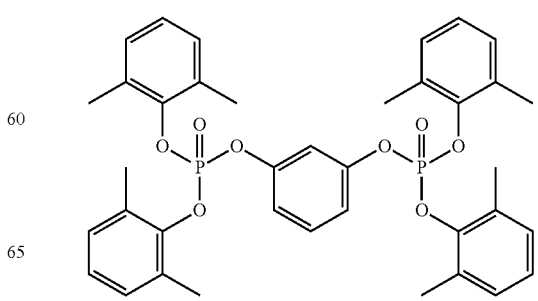

These compounds are available commercially from Daihachi as PX-200®, CAS No. 139189-30-3 or from ICL-IP as Sol-DP®.

The molding compositions of the invention can comprise, as component G), from 0 to 50% by weight, in particular up to 40% by weight, of other additional substances and processing aids.

Additional substances E) usually used are by way of example quantities of up to 40% by weight, preferably up to 15% by weight, of elastomeric polymers (often also termed impact modifiers, elastomers or rubbers).

Very generally, these are copolymers which are preferably composed of at least two of the following monomers: ethylene, propylene, butadiene, isobutene, isoprene, chloroprene, vinyl acetate, styrene, acrylonitrile, and acylic or methacrylic esters having from 1 to 18 carbon atoms in the alcohol component.

Polymers of this type are described, for example, in Houben-Weyl, Methoden der organischen Chemie, Vol. 14/1 (Georg-Thieme-Verlag, Stuttgart, Germany, 1961), pages 392-406, and in the monograph by C. B. Bucknall, "Toughened Plastics" (Applied Science Publishers, London, UK, 1977).

Some preferred types of these elastomers are described below.

Preferred types of elastomers are those known as ethylene-propylene (EPM) and ethylene-propylene-diene (EPDM) rubbers.

EPM rubbers generally have practically no residual double bonds, whereas EPDM rubbers may have from 1 to 20 double bonds per 100 carbon atoms.

Examples which may be mentioned of diene monomers for EPDM rubbers are conjugated dienes, such as isoprene and butadiene, non-conjugated dienes having from 5 to 25 carbon atoms, such as 1,4-pentadiene, 1,4-hexadiene, 1,5-hexadiene, 2,5-dimethyl-1,5-hexadiene and 1,4-octadiene, cyclic dienes, such as cyclopentadiene, cyclohexadienes, cyclooctadienes and dicyclopentadiene, and also alkenylnorbornenes, such as 5-ethylidene-2-norbornene, 5-butylidene-2-norbornene, 2-methallyl-5-norbornene and 2-isopropenyl-5-norbornene, and tricyclodienes, such as 3-methyltricyclo[5.2.1.0$^{2,6}$]-3,8-decadiene, and mixtures of these. Preference is given to 1,5-hexadiene, 5-ethylidenenorbornene and dicyclopentadiene. The diene content of the EPDM rubbers is preferably from 0.5 to 50% by weight, in particular from 1 to 8% by weight, based on the total weight of the rubber.

EPM and EPDM rubbers may preferably also have been grafted with reactive carboxylic acids or with derivatives of these. Examples of these are acrylic acid, methacrylic acid and derivatives thereof, e.g. glycidyl (meth)acrylate, and also maleic anhydride.

Copolymers of ethylene with acrylic acid and/or methacrylic acid and/or with the esters of these acids are another group of preferred rubbers. The rubbers may also comprise dicarboxylic acids, such as maleic acid and fumaric acid, or derivatives of these acids, e.g. esters and anhydrides, and/or monomers comprising epoxy groups. These monomers comprising dicarboxylic acid derivatives or comprising epoxy groups are preferably incorporated into the rubber by adding to the monomer mixture monomers comprising dicarboxylic acid groups and/or epoxy groups and having the general formulae I, II, III or IV below:

 (I)

 (II)

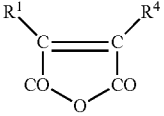

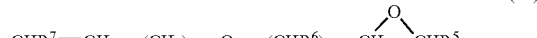 (III)

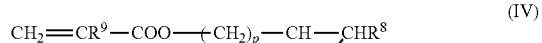 (IV)

where $R^1$ to $R^9$ are hydrogen or alkyl groups having from 1 to 6 carbon atoms, and m is a whole number from 0 to 20, g is a whole number from 0 to 10, and p is a whole number from 0 to 5.

It is preferable that the moities $R^1$ to $R^9$ are hydrogen, where m is 0 or 1 and g is 1. The corresponding compounds are maleic acid, fumaric acid, maleic anhydride, allyl glycidyl ether, and vinyl glycidyl ether.

Preferred compounds of the formulae I, II and IV are maleic acid, maleic anhydride and (meth)acrylates comprising epoxy groups, such as glycidyl acrylate and glycidyl methacrylate, and the esters with tertiary alcohols, such as tert-butyl acrylate. Although the latter have no free carboxy groups, their behavior approximates to that of the free acids and they are therefore termed monomers with latent carboxy groups.

The copolymers are advantageously composed of from 50 to 98% by weight of ethylene, from 0.1 to 20% by weight of monomers comprising epoxy groups and/or methacrylic acid and/or monomers comprising anhydride groups, the remaining amount being (meth)acrylates.

Particular preference is given to copolymers of from 50 to 98% by weight, in particular from 55 to 95% by weight, of ethylene, from 0.1 to 40% by weight, in particular from 0.3 to 20% by weight, of glycidyl acrylate and/or glycidyl methacrylate, (meth)acrylic acid, and/or maleic anhydride, and from 1 to 45% by weight, in particular from 10 to 40% by weight, of n-butyl acrylate and/or 2-ethylhexyl acrylate.

Other preferred (meth)acrylates are the methyl, ethyl, propyl, isobutyl and tert-butyl esters.

Comonomers which may also be used alongside these are vinyl esters and vinyl ethers.

The ethylene copolymers described above may be prepared by processes known per se, preferably by random copolymerization at high pressure and elevated temperature. Appropriate processes are well known.

Other preferred elastomers are emulsion polymers whose preparation is described, for example, by Blackley in the monograph "Emulsion Polymerization". The emulsifiers and catalysts which can be used are known per se.

In principle it is possible to use homogeneously structured elastomers or else those with a shell structure. The shell-type structure is determined by the sequence of addition of the individual monomers. The morphology of the polymers is also affected by this sequence of addition.

Monomers which may be mentioned here, merely as examples, for the preparation of the rubber fraction of the elastomers are acrylates, such as n-butyl acrylate and 2-ethylhexyl acrylate, corresponding methacrylates, butadiene and isoprene, and also mixtures of these. These monomers may be copolymerized with other monomers, such as styrene, acrylonitrile, vinyl ethers and with other acrylates or methacrylates, such as methyl methacrylate, methyl acrylate, ethyl acrylate or propyl acrylate.

The soft or rubber phase (with glass transition temperature below 0° C.) of the elastomers may be the core, the outer envelope or an intermediate shell (in the case of elastomers whose structure has more than two shells). Elastomers having more than one shell may also have more than one shell composed of a rubber phase.

If one or more hard components (with glass transition temperatures above 20° C.) are involved, besides the rubber phase, in the structure of the elastomer, these are generally prepared by polymerizing, as principal monomers, styrene, acrylonitrile, methacrylonitrile, α-methylstyrene, p-methylstyrene, or acrylates or methacrylates, such as methyl acrylate, ethyl acrylate or methyl methacrylate. Besides these, it is also possible to use relatively small proportions of other comonomers here.

It has proven advantageous in some cases to use emulsion polymers which have reactive groups at the surface. Examples of groups of this type are epoxy, carboxy, latent carboxy, amino and amide groups, and also functional groups which may be introduced by concomitant use of monomers of the general formula

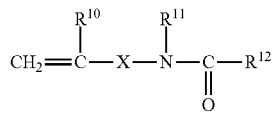

where the substituents may be defined as follows:
$R^{10}$ is hydrogen or $C_1$-$C_4$-alkyl group,
$R^{11}$ is hydrogen or $C_1$-$C_5$-alkyl group or aryl group, in particular phenyl,
$R^{12}$ is hydrogen, $C_1$-$C_{10}$-alkyl group, $C_6$-$C_{12}$-aryl group or —$OR^{13}$
$R^{13}$ is a $C_1$-$C_5$-alkyl group or $C_6$-$C_{12}$-aryl group, optionally with substitution by O- or N-comprising groups,
X is a chemical bond, a $C_1$-$C_{10}$-alkylene group or $C_6$-$C_{12}$-arylene group, or

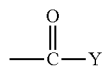

Y is O—Z or NH—Z, and
Z is a $C_1$-$C_{10}$-alkylene group or $C_6$-$C_{12}$-arylene group.

The graft monomers described in EP-A 208 187 are also suitable for introducing reactive groups at the surface.

Other examples which may be mentioned are acrylamide, methacrylamide and substituted acrylates or methacrylates, such as (N-tert-butylamino)ethyl methacrylate, (N,N-dimethylamino)ethyl acrylate, (N,N-dimethylamino)methyl acrylate and (N,N-diethylamino)ethyl acrylate.

The particles of the rubber phase may also have been crosslinked. Examples of crosslinking monomers are 1,3-butadiene, divinylbenzene, diallyl phthalate and dihydrodicyclopentadienyl acrylate, and also the compounds described in EP-A 50 265.

It is also possible to use the monomers known as graft-linking monomers, i.e. monomers having two or more polymerizable double bonds which react at different rates during the polymerization. Preference is given to the use of compounds of this type in which at least one reactive group polymerizes at about the same rate as the other monomers, while the other reactive group (or reactive groups), for example, polymerize(s) significantly more slowly. The different polymerization rates give rise to a certain proportion of unsaturated double bonds in the rubber. If another phase is then grafted onto a rubber of this type, at least some of the double bonds present in the rubber react with the graft monomers to form chemical bonds, i.e. the phase grafted on has at least some degree of chemical bonding to the graft base.

Examples of graft-linking monomers of this type are monomers comprising allyl groups, in particular allyl esters of ethylenically unsaturated carboxylic acids, for example allyl acrylate, allyl methacrylate, diallyl maleate, diallyl fumarate and diallyl itaconate, and the corresponding mono-allyl compounds of these dicarboxylic acids. Besides these there is a wide variety of other suitable graft-linking monomers. For further details reference may be made here, for example, to U.S. Pat. No. 4,148,846.

The proportion of these crosslinking monomers in the impact-modifying polymer is generally up to 5% by weight, preferably not more than 3% by weight, based on the impact-modifying polymer.

Some preferred emulsion polymers are listed below. Mention may first be made here of graft polymers with a core and with at least one outer shell, and having the following structure:

| Type | Monomers for the core | Monomers for the envelope |
|---|---|---|
| I | 1,3-butadiene, isoprene, n-butyl acrylate, ethylhexyl acrylate, or a mixture of these | styrene, acrylonitrile, methyl methacrylate |
| II | as I, but with concomitant use of crosslinking agents | as I |
| III | as I or II | n-butyl acrylate, ethyl acrylate, methyl acrylate, 1,3-butadiene, isoprene, ethylhexyl acrylate |
| IV | as I or II | as I or III, but with concomitant use of monomers having reactive groups, as described herein |
| V | styrene, acrylonitrile, methyl methacrylate, or a mixture of these | first envelope composed of monomers as described under I and II for the core, second envelope as described under I or IV for the envelope |

These graft polymers, in particular ABS polymers and/or ASA polymers, are preferably used in amounts of up to 40% by weight for the impact-modification of PBT optionally in a mixture with up to 40% by weight of polyethylene terephthalate. Blend products of this type are obtainable with the trademark Ultradur®S (previously Ultrablend®S from BASF AG).

Instead of graft polymers whose structure has more than one shell, it is also possible to use homogeneous, i.e. single-shell, elastomers composed of 1,3-butadiene, isoprene and n-butyl acrylate or from copolymers of these. These products, too, may be prepared by concomitant use of crosslinking monomers or of monomers having reactive groups.

Examples of preferred emulsion polymers are n-butyl acrylate-(meth)acrylic acid copolymers, n-butyl acrylate-glycidyl acrylate or n-butyl acrylate-glycidyl methacrylate copolymers, graft polymers with an inner core composed of n-butyl acrylate or based on butadiene and with an outer envelope composed of the abovementioned copolymers, and copolymers of ethylene with comonomers which supply reactive groups.

The elastomers described may also be prepared by other conventional processes, e.g. by suspension polymerization.

Preference is also given to silicone rubbers, as described in DE-A 37 25 576, EP-A 235 690, DE-A 38 00 603 and EP-A 319 290.

It is, of course, also possible to use mixtures of the types of rubber listed above.

Fibrous or particulate fillers G) that may be mentioned are glass fibers, glass beads, amorphous silica, asbestos, calcium silicate, calcium metasilicate, magnesium carbonate, kaolin, chalk, mica, barium sulfate, feldspar and powdered quartz. Amounts used of fibrous fillers G) are up to 50% by weight, in particular up to 35% by weight, and amounts used of particulate fillers are up to 30% by weight, in particular up to 10% by weight.

Preferred fibrous fillers that may be mentioned are aramid fibers and potassium titanate fibers, and particular preference is given here to glass fibers in the form of E glass. These can be used in the form of rovings or chopped glass in the forms commercially available.

Amounts used of highly laser-absorbent fillers, such as carbon fibers, carbon black, graphite, graphene, or carbon nanotubes, are preferably below 1% by weight, particularly preferably below 0.05% by weight.

In order to improve compatibility with the thermoplastic, the fibrous fillers can have been surface-pretreated with a silane compound.

Suitable silane compounds are those of the general formula

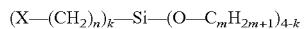

in which the definitions of the substituents are as follows:
x NH$_2$—,

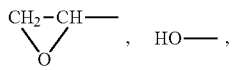, HO—, n is a whole number from 2 to 10, preferably from 3 to 4
m is a whole number from 1 to 5, preferably from 1 to 2
k is a whole number from 1 to 3, preferably 1.

Preferred silane compounds are aminopropyltrimethoxysilane, aminobutyltrimethoxysilane, aminopropyltriethoxysilane, aminobutyltriethoxysilane, and also the corresponding silanes which comprise a glycidyl group as substituent X.

The amounts generally used of the silane compounds for surface coating are from 0.05 to 5% by weight, preferably from 0.1 to 1.5% by weight, and in particular from 0.2 to 0.5% by weight (based on G).

Acicular mineral fillers are also suitable.

For the purposes of the invention, acicular mineral fillers are mineral fillers with strongly developed acicular character. An example is acicular wollastonite. The mineral preferably has an L/D (length to diameter) ratio of from 8:1 to 35:1, preferably from 8:1 to 11:1. The mineral filler may, optionally, have been pretreated with the abovementioned silane compounds, but the pretreatment is not essential.

The thermoplastic molding compositions of the invention can comprise, as component G), the usual processing aids, such as stabilizers, oxidation retarders, agents to counteract decomposition due to heat and decomposition due to ultraviolet light, lubricants and mold-release agents, colorants, such as dyes and pigments, plasticizers, etc.

Examples which may be mentioned of oxidation retarders and heat stabilizers are sterically hindered phenols and/or phosphites, hydroquinones, aromatic secondary amines, such as diphenylamines, various substituted members of these groups, and mixtures of these in concentrations of up to 1% by weight, based on the weight of the thermoplastic molding compositions.

UV stabilizers which may be mentioned, and are generally used in amounts of up to 2% by weight, based on the molding composition, are various substituted resorcinols, salicylates, benzotriazoles, and benzophenones.

Colorants that can be added are inorganic and organic pigments, and also dyes, for example nigrosin and anthraquinones. EP 1722984 B1, EP 1353986 B1, or DE 10054859 A1 by way of example mention particularly suitable colorants.

Preference is further given to esters or amides of saturated or unsaturated aliphatic carboxylic acids having from 10 to 40, preferably from 16 to 22, carbon atoms with saturated aliphatic alcohols or amines which comprise from 2 to 40, preferably from 2 to 6, carbon atoms.

The carboxylic acids can be mono- or dibasic. Examples which may be mentioned are pelargonic acid, palmitic acid, lauric acid, margaric acid, dodecanedioic acid, behenic acid, and particularly preferably stearic acid, capric acid, and also montanic acid (a mixture of fatty acids having from 30 to 40 carbon atoms).

The aliphatic alcohols can be mono- to tetrahydric. Examples of alcohols are n-butanol, n-octanol, stearyl alcohol, ethylene glycol, propylene glycol, neopentyl glycol, and pentaerythritol, preference being given to glycerol and pentaerythritol.

The aliphatic amines can be mono- to trifunctional. Examples of these are stearylamine, ethylenediamine, propylenediamine, hexamethylenediamine, and di(6-aminohexyl)amine, particular preference being given here to ethylenediamine and hexamethylenediamine. Preferred esters or amides are correspondingly glycerol distearate, glycerol tristearate, ethylenediamine distearate, glycerol monopalmitate, glycerol trilaurate, glycerol monobehenate, and pentaerythritol tetrastearate.

It is also possible to use mixtures of various esters or amides, or esters with amides in combination, in any desired mixing ratio.

The amounts usually used of other lubricants and mold-release agents are up to 1% by weight. Preference is given to long-chain fatty acids (e.g. stearic acid or behenic acid), salts of these (e.g. Ca stearate or Zn stearate), or montan waxes (mixtures of straight-chain, saturated carboxylic acids having chain lengths of from 28 to 32 carbon atoms), Ca montanate or Na montanate, and also low-molecular-weight polyethylene waxes and low-molecular-weight polypropylene waxes.

Examples that may be mentioned of plasticizers are dioctyl phthalate, dibenzyl phthalate, butyl benzyl phthalate, hydrocarbon oils, and N-(n-butyl)benzenesulfonamide.

The molding compositions of the invention can also comprise from 0 to 2% by weight of fluorine-containing ethylene polymers. These are polymers of ethylene having from 55 to 76% by weight fluorine content, preferably from 70 to 76% by weight.

Examples of these are polytetrafluoroethylene (PTFE), tetrafluoroethylene-hexafluoropropylene copolymers and tetrafluoroethylene copolymers with relatively small proportions (generally up to 50% by weight) of copolymerizable ethylenically unsaturated monomers. These are described, for example, by Schildknecht in "Vinyl and Related Polymers", Wiley-Verlag, 1952, pages 484-494 and by Wall in "Fluoropolymers" (Wiley Interscience, 1972).

These fluorine-comprising ethylene polymers have homogeneous distribution in the molding compositions and preferably have a particle size $d_{50}$ (numeric average) in the range from 0.05 to 10 μm, in particular from 0.1 to 5 μm. These small particle sizes can particularly preferably be achieved by the use of aqueous dispersions of fluorine-containing ethylene polymers and the incorporation of these into a polyester melt.

The inventive thermoplastic molding compositions may be prepared by methods known per se, by mixing the starting components in conventional mixing apparatus, such as screw extruders, Brabender mixers or Banbury mixers, and then extruding them. The extrudate may then be cooled and comminuted. It is also possible to premix individual components (an example being application, in a drum or otherwise, of individual components to the pellets), and then to add the remaining starting materials individually and/or likewise in a mixture. The mixing temperatures are generally from 230 to 290° C.

In another preferred mode of operation, the respective components can be mixed with a polyester prepolymer, compounded and pelletized. The resultant pellets are then condensed in the solid phase under inert gas, continuously or batchwise, at a temperature below the melting point of component A) until the desired viscosity has been reached.

The molding compositions of the invention feature good mechanical and flame-retardancy properties. Migration properties and processing properties are improved. In particular, thin-wall applications exhibit good flame retardancy and mechanical properties.

The moldings produced from the molding compositions of the invention are used for the production of internal and external parts, preferably with load-bearing or mechanical function in any of the following sectors: electrical, furniture, sports, mechanical engineering, sanitary and hygiene, medical, power engineering and drive technology, automobile and other means of transport, or housing material for equipment and apparatuses for telecommunications, consumer electronics, household devices, mechanical engineering, the heating sector, or fastening parts for installation work, or for containers and ventilation parts of any type.

These materials are suitable for the production of fibers, foils, and moldings of any type, in particular for applications as plugs, switches, housing parts, housing covers, headlamp bezels, shower heads, fittings, smoothing irons, rotary switches, stove controls, fryer lids, door handles, (rear) mirror housings, (tailgate) screen wipers, sheathing for optical conductors.

Devices which can be produced with the polyesters of the invention in the electrical and electronics sector are: plugs, plug parts, plug connectors, cable harness components, circuit mounts, circuit mount components, three-dimensionally injection-molded circuit mounts, electrical connector elements, mechatronic components, and optoelectronic components.

Possible uses in automobile interiors are for dashboards, steering-column switches, seat parts, headrests, center consoles, gearbox components, and door modules, and possible uses in automobile exteriors are for door handles, headlamp components, exterior mirror components, windshield wiper components, windshield wiper protective housings, decorative grilles, roof rails, sunroof frames, and exterior bodywork parts.

Possible uses of the polyesters in the kitchen and household sector are: production of components for kitchen equipment, e.g. fryers, smoothing irons, buttons, and also garden and leisure sector applications, such as components for irrigation systems or garden equipment.

EXAMPLES

Component A:
Polybutylene terephthalate with intrinsic viscosity IV 130 ml/g and carboxy end group content 34 meq/kg (Ultradur® B 4520 from BASF SE) (IV measured in 0.5% by weight solution of phenol/o-dichlorobenzene, 1:1 mixture, at 25° C. in accordance with DIN 53728 and ISO 1628), comprising 0.65% by weight, based on A, of pentaerythritol tetrastearate as lubricant (G1).

Component B:
Poly-(ε)-caprolactone (Capa® 6500 from Perstorp): $M_w$ (GPC, hexafluoroisopropanol/0.05% of potassium trifluoroacetate, PMMA standard): 99 300 g/mol with intrinsic viscosity IV 226 ml/g (IV measured in 0.5% by weight solution of phenol/o-dichlorobenzene, 1:1 mixture, at 25° C. in accordance with DIN 53728 and ISO 1628). Melting range (DSC, 20 K/min in accordance with DIN 11357): from 58-60° C.

Component C:
Copolyester: polybutylene sebacate-co-terephthalate, melting point (DSC, 20 K/min in accordance with DIN 11357): from 110-120° C., $M_w$ (GPC, hexafluoroisopropanol/0.05% of potassium trifluoroacetate, PMMA standard): 94 600 g/mol.

Component D/1:
Al diethylphosphinate (Exolit® OP 1240 from Clariant GmbH): particle size d (0.9)=80.194 μm determined with Mastersizer 2000 (measurement range from 0.02 to 20 000 μm) in water.

Component D/2:
Al diethylphosphinate (Exolit® OP 935 from Clariant GmbH): particle size d (0.9)=5.613 μm determined with Mastersizer 2000 (measurement range from 0.02 to 20 000 μm) in water.

Component F:
PX-200 from Daihachi Chem.: melting point (DSC, 20 K/min in accordance with DIN 11357): 95° C.

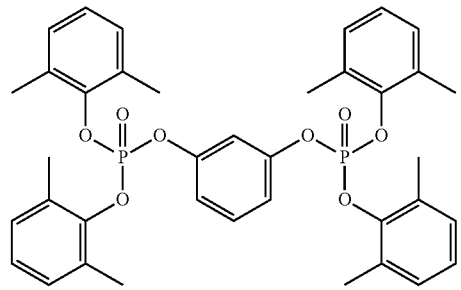 [SMILES: Cc1cccc(C)c1OP(=O)(Oc1cccc(OP(=O)(Oc2c(C)cccc2C)Oc2c(C)cccc2C)c1)Oc1c(C)cccc1C]

Component G/2:
Dyneon TF2071 PPFE from 3M (Dyneon). The TDS particle size is 500 μm (ISO 12086) and density is 2.16 g/cm³ (ISO 12086).

Production of the Molding Compositions
Production of the compositions in Table 1 began by compounding individual components to give concentrates (masterbatches) of D (42.5% by weight) in A) and F (38% by weight) in A).

The masterbatches and the respective other components were metered by way of separate metering balances into the injection-molding machine described below and processed directly to give the corresponding injection-molded test samples. Throughput in all experiments was 10 kg/h. Operating temperatures were 250° C. for the nozzle and 20° C. for the intake. Zone temperature was increased in steps of from 5 to 10° C. from a temperature of 230° C. at the melting zone to a temperature of 255° C. at the mixing head.

The molding compositions for the inventive examples in Table 2 were produced by means of a ZE25 twin-screw extruder. The temperature profile was kept constant, increasing from 240° C. in zone 1 to 260° C. (zones 2-9). Rotation rate was set at 130 rpm, resulting in throughput of about 7.5 to 9.6 kg/h, depending on formulation. The extrudate was drawn through a water bath and pelletized. The pellets were then processed by injection molding.

Testing of Properties:

The flame retardancy test was carried out in accordance with UL 94 on test specimens of thickness 1.6 mm for Table 1 and specimens of thickness 0.8/0.4 mm for Table 2.

The Q2000 instrument from TA Instruments was used for DSC. Input weight was about 8.5 mg. The undried sample was heated from −20° C. to 200° C. at a heating rate of 20° C./min, and melting point was determined during the heating procedure as temperature maximum of the peak resulting from the melting process (DIN 11357).

The molar mass distribution of the polymers was determined by the size exclusion chromatography method (=SEC or GPC). Narrowly distributed PMMA standards from PSS with molar masses M of from 800 g/mol to 1 820 000 g/mol were used for calibration. Values outside of this elution range did not arise to any significant extent. The measurement methods were substantially based on DIN 55672-2: 2008-06.

Eluent: Hexafluoroisopropanol+0.05% of potassium trifluoroacetate
Column temperature: 35° C.
Flow rate: 1 ml/min
Injection: 50 μL
Concentration: 1.5 mg/ml
Sample solutions were filtered through Millipore Millex FG (0.2 μm)
Detector: DRI Agilent 1100
Packing material: Styrene-divinylbenzene
Column length: 30 cm
Internal diameter: 7.5 mm All mechanical data in Table 1 were determined as follows: Tensile strain measurements on 5 standard test samples per formulation (Type 1A in accordance with ISO 294-1) were made with a Zwick/Roell T1-FR010TH.A50 tensile tester in accordance with ISO 527-1 (max. test force: 10 kN, pretensioning force: 0.3 MPa). Charpy impact resistance and notched impact resistance measurements were likewise made on 5 test samples per formulation (Type B in accordance with ISO 294-1) with a Zwick/Roell HIT5.5P pendulum impact tester, where appropriate after prior preparation with a ZNO rotary notch cutter from Zwick/Roell in accordance with ISO 179-1 (nominal energy: 5 J, impact velocity: 2.9 m/s).

All of the mechanical data in Table 2 were determined in accordance with the same standards. Machines used, however, were an Instron Wolpert pendulum impact tester and a Zwick (Z020) tensile tester. Nominal tensile strain at break was determined in accordance with ISO 527-1, equation 11, on a Type 1A specimen.

The tables show the compositions and the test results.

TABLE 1

Components in [% by weight]

| | Ref | Inv1 | Inv2 | Inv3 | Inv4 | Comp1 | Comp2 | Comp3 | Comp4 | Comp5 | Comp6 |
|---|---|---|---|---|---|---|---|---|---|---|---|
| A + G/1 | 100 | 67.0 | 69.0 | 66.0 | 73.0 | 70.0 | 76.0 | 76.0 | 70.0 | 70.0 | 72.0 |
| B | | 3.0 | 3.0 | 6.0 | 3.0 | 10.0 | 4.0 | | | | 4.0 |
| C | | 4.0 | 2.0 | 2.0 | 4.0 | | | 4.0 | 10.0 | 4.0 | |
| F | | 6.0 | 6.0 | 6.0 | | | | | | 6.0 | 4.0 |
| D/1 | | 20.0 | 20.0 | 20.0 | 20.0 | 20.0 | 20.0 | 20.0 | 20.0 | 20.0 | 20.0 |
| Yield strain [%] | 3.4 | 3.86 | 3.05 | 3.29 | 2.51 | 2.15 | 2.09 | 2.17 | 2.8 | 2.93 | 2.4 |
| Tensile strain at break [%] | 46.5 | 40.5 | 35.9 | 26.5 | 21.6 | 12.5 | 14.5 | 9.3 | 14.4 | 15.1 | 21.1 |
| Impact resistance [kJ/m2] | 124.6 | 27.8 | 25.1 | 25.9 | 26.3 | 24.5 | 25.1 | 22.7 | 25.7 | 21.5 | 25 |
| UL94 V classification, 1.6 mm | none | V0 | V0 | V0 | V0 | V0 | V0 | V0 | V2 | V0 | V0 |

TABLE 2

| Components [% by weight] | Inv1 | Inv2 | Inv3 | Inv4 | Comp1 |
|---|---|---|---|---|---|
| A + G/1 | 73.5 | 70 | 70.5 | 72 | 79.5 |
| B | 2.5 | 2.5 | 4 | 4 | 0 |
| C | 2.5 | 4.0 | 4 | 4 | 0 |
| D/2 | 18.0 | 20.0 | 18 | 18 | 20.0 |
| F | 3.0 | 3.0 | 3 | 1.5 | 0 |
| G/2 | 0.5 | 0.5 | 0.5 | 0.5 | 0.5 |
| Yield strain [%] | 3.1 | 3.0 | 3.7 | 4 | 2.4 |
| Tensile strain at break [%] | | | | | |
| Nom. tensile strain at break [%] | 22.2 | 17.4 | 27.4 | 20.4 | 4.0 |
| Impact resistance [kJ/m2] | 74.5 | 77.6 | 114 | 70 | 22.5 |
| UL94 V classification, 0.4 mm | V-0 | V-0 | V-0 | V-0 | V-2 |
| UL94 V classification, 0.8 mm | V-0 | V-0 | V-0 | V-0 | V-2 |

The invention claimed is:

1. A thermoplastic molding composition comprising
   A) from 10 to 99% by weight of at least one thermoplastic polyester differing from C) and based on an aromatic dicarboxylic acid and an aliphatic or aromatic dihydroxy compound
   B) from 0.5 to 15% by weight of a poly(ε-caprolactone)
   C) from 0.1 to 30% by weight of a biodegradable aliphatic-aromatic polyester differing from B)
   D) from 0.1 to 30% by weight of a phosphinic salt
   E) from 0 to 20% by weight of a nitrogen-containing flame retardant
   F) from 0 to 15% by weight of an aromatic phosphate ester having at least one alkyl-substituted phenyl ring
   G) from 0 to 50% by weight of further additional substances,
   where the sum of the percentages by weight of components A) to G) is 100%.

2. The thermoplastic molding composition according to claim 1, comprising
   A) from 10 to 99% by weight
   B) from 0.5 to 15% by weight C) from 0.1 to 30% by weight
D) from 0.1 to 30% by weight
E) from 0 to 20% by weight
F) from 0.1 to 15% by weight
G) from 0 to 50% by weight.

3. The thermoplastic molding composition according to claim 1 in which component D) comprises phosphinic salts of the formula (I) or/and diphosphinic salts of the formula (II) or of polymers of these

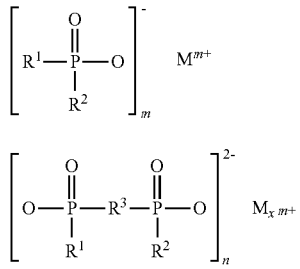

in which $R^1$ and $R^2$, being identical or different, are hydrogen or, in linear or branched form, $C_1$-$C_6$-alkyl, and/or aryl oder

R' is hydrogen, phenyl, tolyl;
$R^3$ is, in linear or branched form, $C_1$-$C_{10}$-alkylene or $C_6$-$C_{10}$-arylene, -alkylarylene or -arylalkylene;
M is Mg, Ca, Al, Sb, Sn, Ge, Ti, Zn, Fe, Zr, Ce, Bi, Sr, Mn, Li, Na, K and/or a protonated nitrogen base;
m is from 1 to 4; n is from 1 to 4; x is from 1 to 4.

4. The thermoplastic molding composition according to claim 3, in which $R^1$ and $R^2$ of component D) are mutually independently hydrogen, methyl or ethyl.

5. The thermoplastic molding composition according to claim 1, in which the melting point of component F), measured by means of DSC in accordance with ISO 11357, 1st heating curve at 20 K/minute, is from 50 to 150° C.

6. The thermoplastic molding composition according to claim 1, in which component F) comprises

III

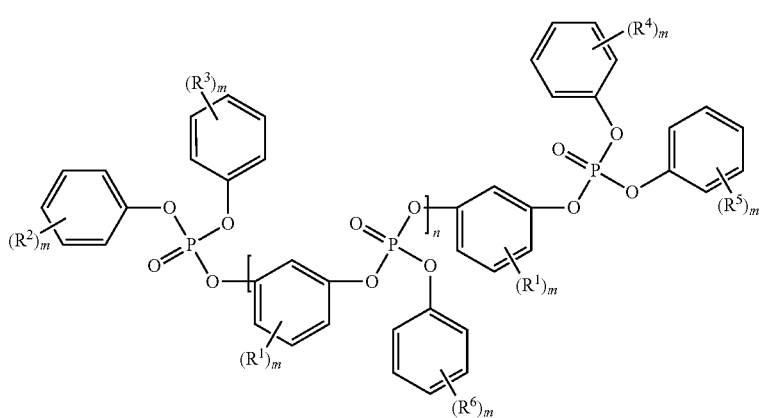

IV

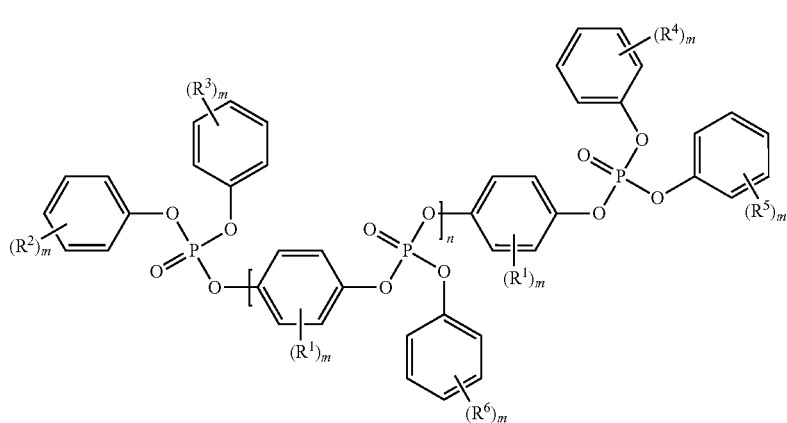

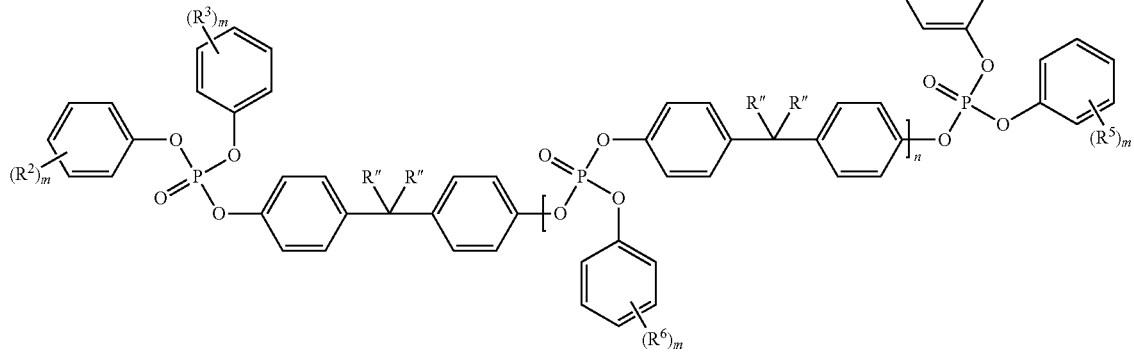

or a mixture of these,
where, mutually independently,
R¹=H, methyl or isopropyl
n=from 0 to 7
R²⁻⁶=H, methyl, ethyl or isopropyl
m=from 1 to 5
R″=H, methyl, ethyl or cyclopropyl,
with the proviso that at least one moiety $R^2$ to $R^6$ is an alkyl moiety.

7. The thermoplastic molding composition according to claim 6, in which the substituents of the general formula III, IV and V are:
R¹ hydrogen or/and
R² to R⁶ methyl or/and
m is from 1 to 2.

8. The thermoplastic molding composition according to claim 1, in which component F) comprises

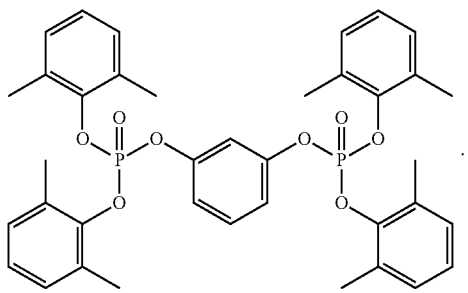 [SMILES: Cc1cccc(C)c1OP(=O)(Oc1cccc(OP(=O)(Oc2c(C)cccc2C)Oc2c(C)cccc2C)c1)Oc1c(C)cccc1C]

9. The thermoplastic molding composition according to claim 1, in which component C) comprises
C1) from 30 to 70 mol %, based on C1) and C2), of an aliphatic dicarboxylic acid or mixture thereof,
C2) from 30 to 70 mol %, based on C1) and C2), of an aromatic dicarboxylic acid or mixture thereof,
C3) from 98.5 to 100 mol %, based on C1) and C2), of 1,4-butanediol or 1,3-propanediol or a mixture of these,
C4) from 0.05 to 1.5% by weight, based on C1) to C3), of a chain extender.

10. A method for the production of fibers, films and moldings comprising the use of a polyester molding composition according to claim 1.

11. A fiber, film, or molding obtained from the polyester molding composition according to claim 1.

12. The thermoplastic molding composition according to claim 1 wherein component A) comprises an aromatic dicarboxylic acid and an aliphatic dihydroxy compound.

13. The thermoplastic molding composition according to claim 1 wherein component A) comprises a polyalkylene terephthalate.

14. The thermoplastic molding composition according to claim 13 wherein the polyalkylene terephthalate comprises an alcohol having 2 to 10 carbon atoms.

15. The thermoplastic molding composition according to claim 1 wherein component B) is present in an amount of from 1 to 10% by weight.

16. The thermoplastic molding composition according to claim 15 wherein component B) is present in an amount of from 1 to 5% by weight.

* * * * *